(12) United States Patent
Petty

(10) Patent No.: US 6,621,792 B1
(45) Date of Patent: Sep. 16, 2003

(54) COMPUTATIONALLY-EFFICIENT TRAFFIC SHAPER

(75) Inventor: Norman W. Petty, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/256,015

(22) Filed: Feb. 23, 1999

(51) Int. Cl.[7] .............................................. H04L 12/26
(52) U.S. Cl. ............................. 370/230.1; 370/395.61; 370/412
(58) Field of Search ............................... 370/412, 395.6, 370/395.61, 474, 516, 517, 394, 512, 465, 230.1, 231, 232, 235, 395.71; 11/352, 478, 516, 517, 468

(56) References Cited

U.S. PATENT DOCUMENTS

| | | | | |
|---|---|---|---|---|
| 6,005,866 A | * | 12/1999 | Lincoln | 370/398 |
| 6,104,700 A | * | 8/2000 | Haddock et al. | 370/235 |
| 6,137,795 A | * | 10/2000 | Tominaga et al. | 370/375 |

OTHER PUBLICATIONS

"3. Generic Cell Rate Algorithm" (pp. 3–1 through 3–2) of "Asynchronous Transfer Mode (ATM) and ATM Adaptation Layer (AAL) Protocols" (title page) Bell Communications Research, Generic Requirements GR–1113–CORE, Issue 1, Jul. 1994, Release 1.

IBM Corp. New York, *Weighted Queueing Algorithm For Efficient Asynchronous Transfer Mode Traffic Shaping*, IBM Technical Disclosure Bulletin, US, Apr. 1, 1996, vol. 39, No. 4, pp. 161–163.

Kalmanek C R et al: *A High–Performance Queueing Engine For ATM Networks,* Proceedings of the International Switching Symposium, JP, Tokyo, vol. SYMP. 14, 1992, pp. 354–358.

29.3 ATM Pace Control (APC) Unit, *MPC 8260 Power QUICC II™ User's Manual,* Motorola Mar. 1999, pp. 29–8 to 29–14.

* cited by examiner

Primary Examiner—Seema S. Rao
Assistant Examiner—Alexander D. Boakye
(74) Attorney, Agent, or Firm—David Volejnicek

(57) ABSTRACT

A computationally-efficient traffic shaper replaces per-virtual-circuit shaping queues that all must be processed during each cell-emission period, with a sequence (130) of shaping queues (131) shared by a plurality of virtual circuits and only one of which must be processed during each cell-emission period. N shaping queues are used, where N is the maximum cell delay effected by the traffic shaper divided by the cell emission period; for constant-bit-rate narrowband virtual circuits, N is 47. Each virtual circuit is assigned one or more of the shaping queues, spaced evenly in the sequence, as its serving queues, proportionally to its size. A dequeue state machine (141) cyclically transmits the contents of a current one of the shaping queues during each period. Per-virtual-circuit instances of an enqueue state machine (140) each enqueue received ATM cells of its corresponding virtual circuit. If the cell arrives on time, it is enqueued in the current queue which is one of the virtual circuit's serving queues. If the cell arrives early, it is enqueued in the virtual circuit's next serving queue. If the cell arrives late, it is enqueued in the current queue, and designation of all of the virtual circuit's serving queues is shifted an equal amount in the sequence so that the current queue becomes one of the virtual circuit's new serving queues. For variable-bit-rate virtual circuits, an additional overflow queue (1100) is used to temporarily hold overflow received cells until the dequeuing makes room for them in the shaping queues.

45 Claims, 11 Drawing Sheets

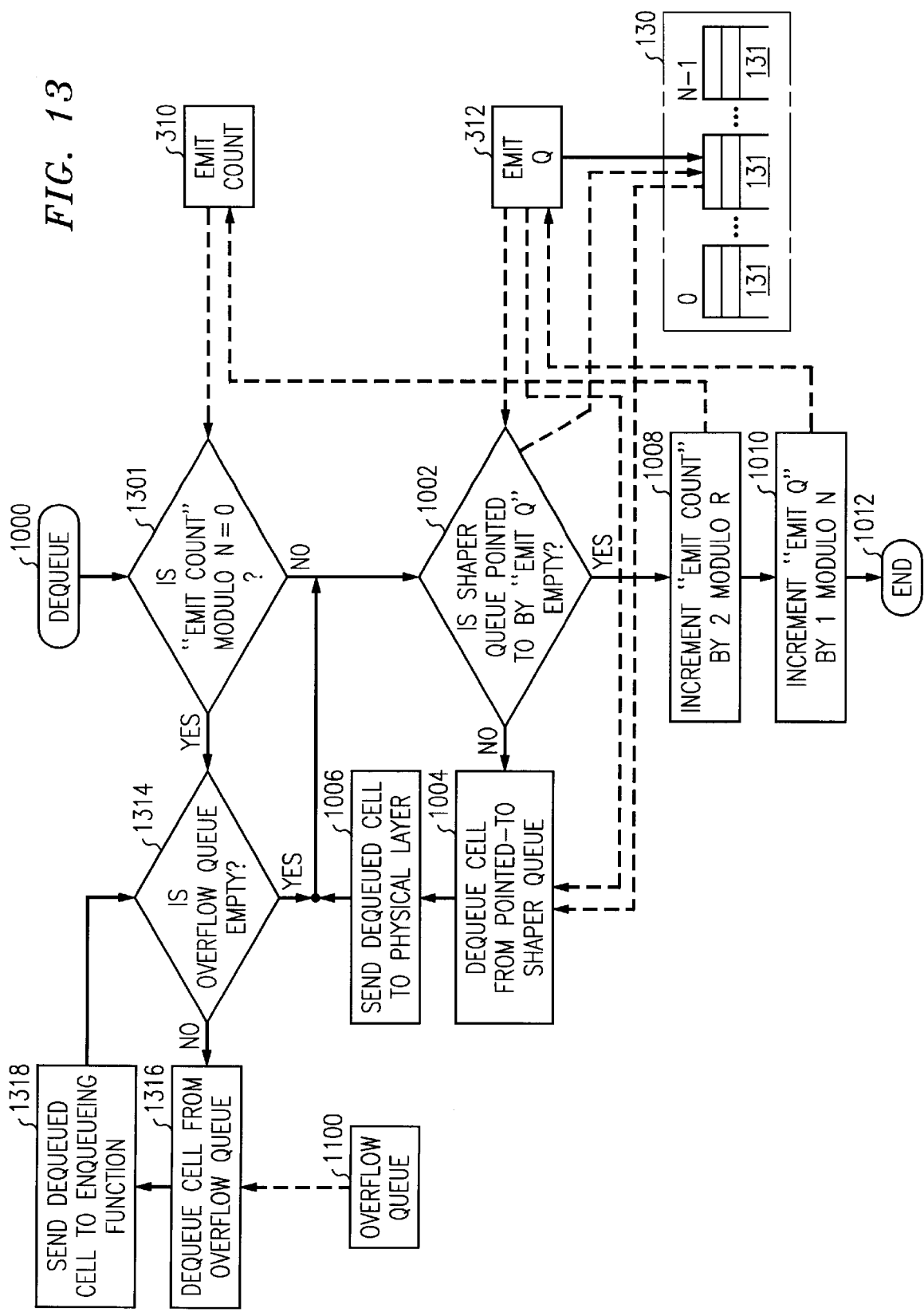

COMPUTATIONALLY-EFFICIENT TRAFFIC SHAPER

TECHNICAL FIELD

This invention relates generally to packet-switching systems, such as asynchronous transfer mode (ATM) systems, and specifically to traffic shapers of such systems.

BACKGROUND OF THE INVENTION

Today's business communications environment consists of two separate network infrastructures: a voice network (such as a private branch exchange (PBX)) characterized by real-time, high-reliability, constant bit-rate (CBR) connections; and a data network (such as a packet network) characterized by high-bandwidth variable bit-rate (VBR) connections. Business needs for simplified maintenance, management, and access to information on diverse networks are forcing the convergence of these networks along with a new class of real-time multimedia networks. Asynchronous transfer mode (ATM) provides a single infrastructure that cost-effectively and flexibly handles both switching and transmission for the traffic types mentioned above (voice, video, and data) for both local-area networks and wide-area networks. The evolving network convergence requires the adaptation of the legacy PBX voice traffic to ATM. Voice telephony over ATM (VTOA) specifications allow adaptation of compressed or uncompressed voice pulse-code modulated (PCM) data streams into streams (virtual circuits) of CBR cells.

An ATM cell, regardless of the traffic it carries, is a packet 53 octets long: 48 octets of payload attached to a 5-octet header. The header contains addressing and management information used to direct the cell from source to destination and to ensure that the negotiated aspects of the traffic-flow through the ATM network are met. CBR traffic is assembled into cell payloads using ATM Adaptation Layer 1 (AAL1). The AAL1 cell constructor layer uses the first octet of the payload for its header and-the remaining 47 octets to carry CBR information. ATM cell construction is then completed by attaching the ATM header to the payload.

An individual ATM cell carries traffic of a single narrowband or wideband channel (a virtual circuit). Illustratively, a narrowband channel is represented by a single time slot of each successive frame of a TDM bus, while a wideband channel is represented by a plurality of time slots of each successive-frame of a TDM bus. If a transmitter handles a to plurality of virtual circuits, different ones of the ATM cells that it transmits carry traffic of different virtual circuits. Likewise, if a receiver handles a plurality of virtual circuits, different ones of the ATM cells that it receives carry traffic of different virtual circuits. A transmitter may transmit the traffic of different virtual circuits to different receivers. Likewise, a receiver may receive the traffic of different virtual circuits from different transmitters.

The traffic of each virtual circuit is processed by its own instance of the AAL1 cell constructor layer; the number of active instances varies as virtual circuits are added and removed. Assuming a channel carrying uncompressed pulse-code modulated (PCM) traffic having an 8 KHz sampling rate, each instance of the cell constructor that is processing a narrowband virtual circuit is supplied one PCM octet every 125 us frame period. It therefore requires 5.875 ms to fill a cell (47 octets * 125 us/octet). Fully constructed (mature) cells from all instances of the cell constructor are then transmitted.

Unlike the constant cell rate from narrowband virtual circuit, a wideband virtual circuit generates a constant average cell rate but a variable instantaneous cell rate. For example, a 32-narrowband-channel-wide wideband virtual circuit is supplied 32 octets during each frame period. The processing sequence effected by its cell constructor instance is as follows: during a first frame period, fill the first 32 octets of a first empty ATM cell; during a second frame period, fill the remaining 15 octets of the first ATM cell, transmit the first ATM cell, and fill the first 17 octets of a second empty ATM cell; during a third frame period, fill the-remaining 30 octets of the second cell, transmit the second cell, and fill the first 2 octets of a third empty cell; etc. This sequence shows an instantaneous cell rate of one cell every 250 us (two frame periods) sometimes and one cell every 125 us (one frame period) at other times. Variable bit-rate virtual circuits, whether narrowband or wideband, provide even greater diversity in the instantaneous cell rate.

ATM switches police cell traffic to ensure that it does not exceed the cell-traffic capacity of the switches. The average cell rate is policed on a per-switch basis, but the peak (instantaneous) cell rate is policed on a per-virtual-circuit basis. Receiving ATM switches delete received cells of each virtual circuit that exceed that virtual circuit's negotiated peak cell rate. And transmitting ATM switches meter out cells from each virtual circuit to ensure that they do not exceed that virtual circuit's negotiated peak cell rate.

The ATM standards specify a Generic Cell Rate Algorithm (GCRA) for use by both hardware and software-implemented devices, called traffic shapers, for metering out cells. The GCRA requires the traffic shapers to periodically process the output queue of each virtual circuit. The period may be different for each virtual circuit, and is a function of the negotiated peak cell rate for that virtual circuit. In the case of PCM traffic having an 8 KHz sampling rate, the processing period is the 125 us frame period. The queues of all virtual circuits are processed during each period. If the queue of a virtual circuit is empty, the traffic shaper does not transmit a cell from that queue. If a cell is available in the queue of a virtual circuit, the traffic shaper transmits it if it meets the GCRA criterion, i.e., if the period between the last transmitted cell from this queue and now is greater than or equal to the minimum administered cell-rate period. If more than one cell is available in the queue of a virtual circuit, the traffic shaper transmits one cell from the queue if it meets the GCRA criterion, and the next cell must wait at least until the subsequent processing period to be transmitted. A spacing of at least 125 us between transmitted ATM cells from any virtual circuit is thus ensured, thereby guaranteeing that the virtual circuit does not exceed its negotiated peak cell rate.

A problem with using the GCRA for multiple virtual circuits is that the traffic shapers must test the output queue of each virtual circuit during each processing period to determine if it has a cell to transmit. This is a particularly onerous task for GCRA implemented in software that supports large numbers (e.g., hundreds) of virtual circuits.

Statistically, however, only one in 47 GCRA queue checks will result in the transmission of a cell during each processing period.

SUMMARY OF THE INVENTION

This invention is directed to solving these and other problems and disadvantages of the prior art. Generally according to the invention, traffic shaping for a plurality of streams of traffic (e.g. ATM virtual circuits or other packetized channels) utilizes a sequence of a first plurality of queues that are shared by the plurality of traffic streams, an enqueuing arrangement, and a dequeuing arrangement. Each of the traffic streams has at least one of the queues designated as its serving queue. Dequeuing is effected by cyclically transmitting contents of the sequence of the queues, i.e., by transmitting the contents of a different sequential one of the queues during each sequential period of the first plurality of such periods. During each period, a queue having a fixed offset in the sequence from the queue whose contents are being transmitted forms a current queue for that period. Preferably, the offset is zero, i.e., the current queue is the one whose contents are being transmitted. Enqueuing is effected as follows. In response to receipt of traffic (e.g., an ATM cell or another packet) from any said traffic stream during a period before a serving queue of that traffic stream becomes the current queue for that period, the received traffic is stored in that serving queue of that traffic stream. In response to receipt of traffic from any said traffic stream during a period when a serving queue of that traffic stream is the current queue for that period, the received traffic is stored in the current queue for that period. In response to receipt of traffic from any said traffic stream during a period after a serving queue of that traffic stream ceased being the current queue for that period, the received traffic is stored in the current queue for that period, and the designation of the at least one serving queue of that traffic stream is changed to designate the current queue of that period as a serving queue of that traffic stream. If a traffic stream has a plurality of serving queues, they are evenly spaced apart in the sequence of queues. The designation of the serving queues is then changed by shifting the designation from each of the serving queues a same distance in the sequence, to other queues that include the current queue. The shifting preferably involves shifting the designation a distance in the sequence from the serving queue of that traffic stream that last ceased being the current queue to the current queue, and shifting the designation from each of the other serving queues of that traffic stream a same distance to another queue.

This arrangement effects traffic shaping for both narrowband and wideband constant-bit-rate channels. For variable-bit-rate channels, an additional overflow queue is used, for temporarily storing any traffic received when enqueuing that traffic in the first plurality of queues would result in storing of that traffic in a queue that presently already stores received traffic of that traffic stream. When dequeuing has made room for storing the traffic that is presently stored in the overflow queue available in the first plurality of queues, enqueuing of that traffic in the first plurality of queues is then effected.

The above-characterized arrangement is very computationally-efficient. For example, while the GCRA of the prior art requires that as many queues as there are traffic streams be checked for an item of traffic to transmit during each dequeuing period, the subject arrangement requires that only one queue be checked and its contents be transmitted during each dequeuing period. Moreover, the subject arrangement often reduces the number of queues that are needed to effect traffic shaping. For example, in the case of an ATM system that transports only narrowband constant-bit-rate virtual circuits, only 47 queues are needed, regardless of how many of the virtual circuits there are. Although it is described below as providing traffic shaping for a plurality of ATM virtual circuits, it can be used for any packetized channels, including frame relay and voice over the Internet, and in fact is not precluded from serving non-packetized channels as well. And although it can be implemented in hardware, the subject arrangement is particularly suited for implementation in software, including firmware.

The invention includes both a method of as well as a corresponding apparatus, and a computer readable medium that contains software which, when executed in a computer, causes the computer to perform the method. The apparatus preferably includes an effector—any entity that effects the corresponding step, unlike a means—for each method step.

These and other features and advantages of the present invention will become more apparent from the following description of an illustrative embodiment of the invention considered together with the drawing.

BRIEF DESCRIPTION OF THE DRAWING

FIG. 13 is a functional flow diagram of a dequeuing function of the state machine of the traffic shaper of FIG. 11.

DETAILED DESCRIPTION

Figure 1:
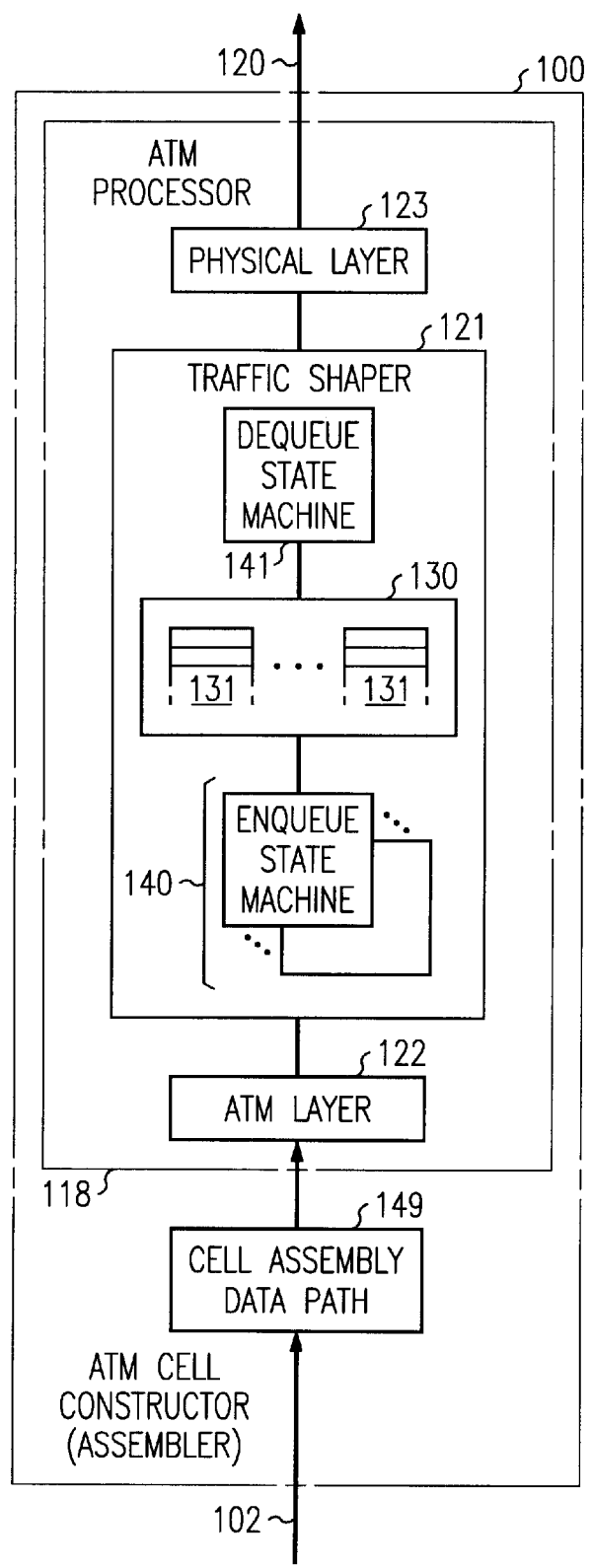
FIG. 1 is a block diagram of an ATM cell constructor that includes an illustrative embodiment of the invention.

FIG. 1 shows an ATM cell constructor 100, also known as an ATM cell assembler, such as may be used in an interface port circuit of a PBX or in any other ATM interface apparatus to construct ATM cells from a stream of traffic, such as voice and/or video traffic. An illustrative example of an ATM cell constructor is described in my patent application entitled "An Arrangement for Minimizing Cell-Delay Variations in a Communications System that Supports Multiple Constant-Bit-Rate Connections", Ser. No. 09/096,887, filed on Jun. 12, 1998, and assigned to the same assignee as this application. Cell constructor 100 and each of its components may be individually implemented either in hardware or in software/firmware, either alone or in an integrated circuit with other devices. The software or firmware may be stored in any desired storage device readable by a computer—for example, a read-only memory (ROM) device readable by an interface port circuit processor. Multiple virtual circuits (also referred to herein as channels, calls, or communications) of CBR traffic are received by ATM cell constructor 100 over a communications medium 102, and follow a data path 149 through ATM cell constructor 100 where successive segments of the traffic are formed into packets (ATM cells). If the switching system employing ATM cell constructor 100 is the Definity® PBX of Lucent Technologies Inc., medium 102 is a time-division multiplexed (TDM) bus that carries up to 242 individual channels of traffic in 242 individual time slots of repeating frames. Each frame carries one (narrowband) or more (wideband) time slots of each channel's traffic stream. Each time slot carries one byte (octet) of traffic.

The bytes of traffic of individual channels are assembled into ATM cells in data path 149. It takes on the order of a TDM bus frame-interval to process an individual time slot of traffic through data path 149; of course, up to a frame's worth of time slots may be processed in parallel. A TDM bus frame-interval is therefore taken as a cell construction period. It is a predetermined time interval during which each virtual circuit can mature an ATM cell for transmission. It can take up to 47 frames to construct a cell, however. An ATM processor 118 sequentially receives mature ATM cells and transmits them on an ATM communications medium 120 towards their destinations. ATM processor 118 comprises a conventional ATM layer 122 and a conventional physical layer 123 interfaced by a traffic shaper 121. Traffic shaper 121 ensures that the peak instantaneous cell transmission rate of each virtual circuit does not exceed its negotiated peak cell rate. Traffic shaper 121 comprises a sequence 130 of shaping queues 131, a traffic shaper dequeue state machine 141, and a plurality of instances of traffic shaper enqueue state machine 140, one instance for each virtual circuit.

Figure 2:
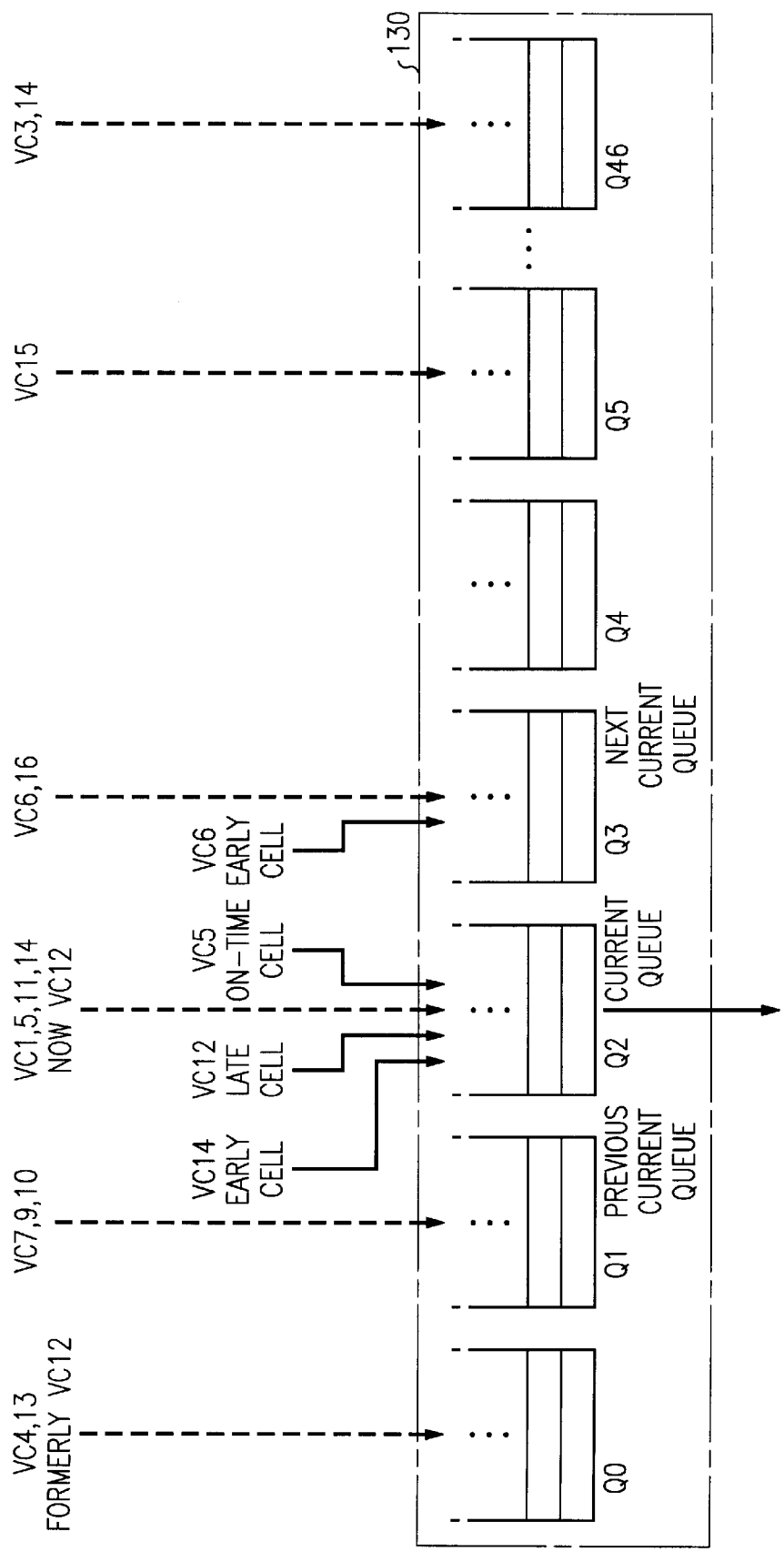
FIG. 2 is a diagram of a first embodiment of a traffic shaper of the ATM cell constructor of FIG. 1.

A first illustrative embodiment of traffic shaper 121 configured according to the invention is shown in FIG. 2. This embodiment is tailored to serve narrowband CBR virtual circuits. It replaces the queue-per-virtual-circuit of the prior art with a sequence 130 of 47 shaping queues, designated in FIG. 2 as Q0–Q46, one per AAL1 cell construction state (i.e., one per ATM cell payload octet), which are shared by all of the virtual circuits.

During each queue processing period (which is a time interval at most equal to an inverse of a peak instantaneous cell rate of a fastest one of the virtual circuits, which is the frame period of 125 us in this instance), one of the queues 131—the current queue—is emptied by dequeue state machine 141 and its contents are sent to physical layer 123. Alternatively, instead of the queue that is presently being emptied, a queue that has a fixed offset of one or more queues 131 in the sequence 130 may be referred to as the current queue during each processing period, for purposes of operation of enqueue state machine 140. During successive sequential queue processing periods, successive sequential ones of the queues 131 are designated as the current queue. Hence, it takes 5.875 ms (47–125 us) to empty all queues 130.

Each instance of enqueue state machine 140 identifies the one of the queues 131 that is designated as serving its corresponding virtual circuit (VC). In the example of FIG. 2, Q0 is indicated as serving VC 4, 12, and 13; Q1 is indicated as serving VC 7, 9, and 10; Q2 is indicated as serving VC 1, 5, 11, and 14; Q3 is indicated as serving VC 6 and 16; Q4 is indicated as not serving any VC; Q5 is indicated as serving VC 15; etc; and Q46 is indicated as serving VC 3 and 14. When ATM layer 121 makes an ATM cell of a virtual circuit available, that virtual circuit's corresponding instance of enqueue state machine 140 enqueues the cell in one of the queues 131, selected as follows. If the cell is on-time, meaning that it becomes available while the serving queue of this VC is the current queue, the state machine instance enqueues the cell in the current queue. For example, if a cell of VC 5 becomes available while Q2, VC 5's serving queue, is the current queue, the cell is enqueued in Q2, as shown in FIG. 2. If the cell is early, meaning that it becomes available before the serving queue of this virtual circuit becomes the current queue, the state machine instance enqueues the cell in the serving queue of this virtual circuit. For example, if a cell of VC 14 becomes available while Q1 is the current queue, the cell is enqueued in Q2, VC 14's serving queue; similarly, if a cell of VC 6 becomes available while Q2 is the current queue, the cell is enqueued in Q3, VC 6's serving queue, as shown in FIG. 2. If the cell is late, meaning that it becomes available after the serving queue of this virtual circuit has ceased to be the current queue, the state machine instead enqueues the cell in the current queue and henceforth changes the designation of the serving queue of this virtual circuit to make the current queue the serving queue of this virtual circuit. For example, if a cell of VC 12, whose serving queue is Q0, becomes available when Q2 is the current queue, the cell is enqueued in Q2 and VC 12's serving queue is henceforth changed from Q0 to Q2, as shown in FIG. 2.

All of this ensures that a minimum interval of 5.785 ms is maintained between successive cells of the same virtual circuit output to physical layer 120, and hence ensures that a virtual circuit does not exceed its peak instantaneous cell rate of one cell per 5.785 ms.

State machines 140–141 together comprise a plurality of functions, shown in FIGS. 3–6. A global initialization function of FIG. 3 initializes state machines 140–141. Upon its invocation at start-up of the system, at step 300, the function sets a global variable "emit count" 310 equal to zero, at step 302, and sets a global variable "emit Q" 312 to point to the first queue 131 of the sequence 130 of shaper queues, at step 304. Its operation then ends, at step 306.

Figure 4:
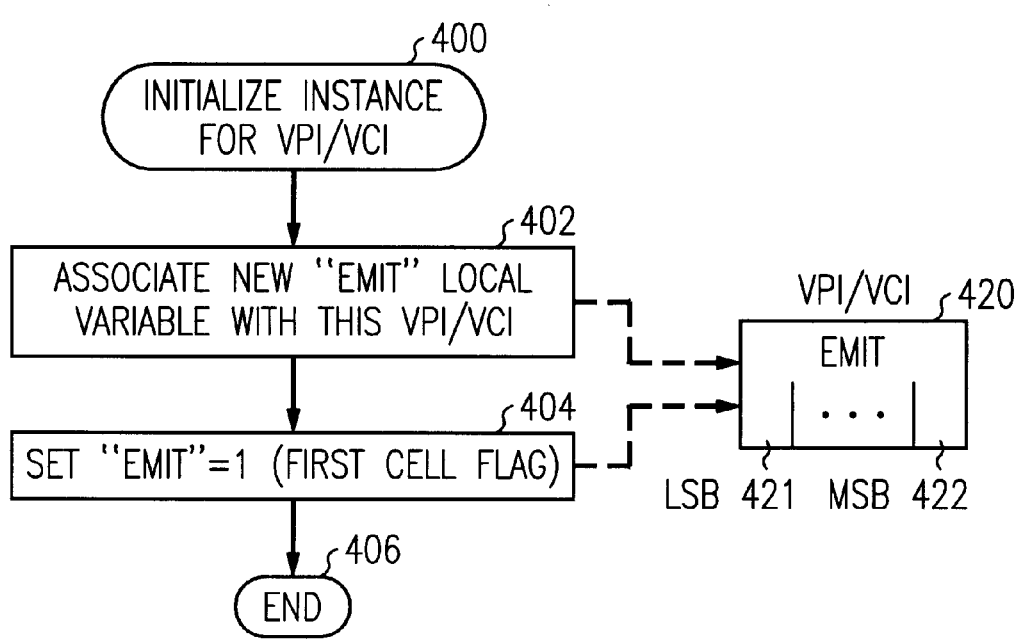
FIG. 4 is a functional flow diagram of an instance initialization function of the state machine of the traffic shaper of FIG. 2.

An instance initialization function of FIG. 4 initializes an instance of dequeue state machine 140 for a particular virtual circuit. Upon its invocation at creation of a virtual circuit, at step 400, the function is passed the VPINCI of this virtual circuit. In response, it associates a new local variable "emit" 420 with this VPINCI, at step 402. "Emit" 420 is a special variable in that its least-significant bit 421 and its most-significant (eighth) bit 422 serve as flags. A set value of LSB 421 serves as a flag that indicates a first cell for this virtual circuit, and a set value of MSB 422 serves as a flag that indicates that a cell is late. After step 402, the function sets LSB 421 to a value of one, at step 404. Its operation then ends, at step 406.

Figure 5:
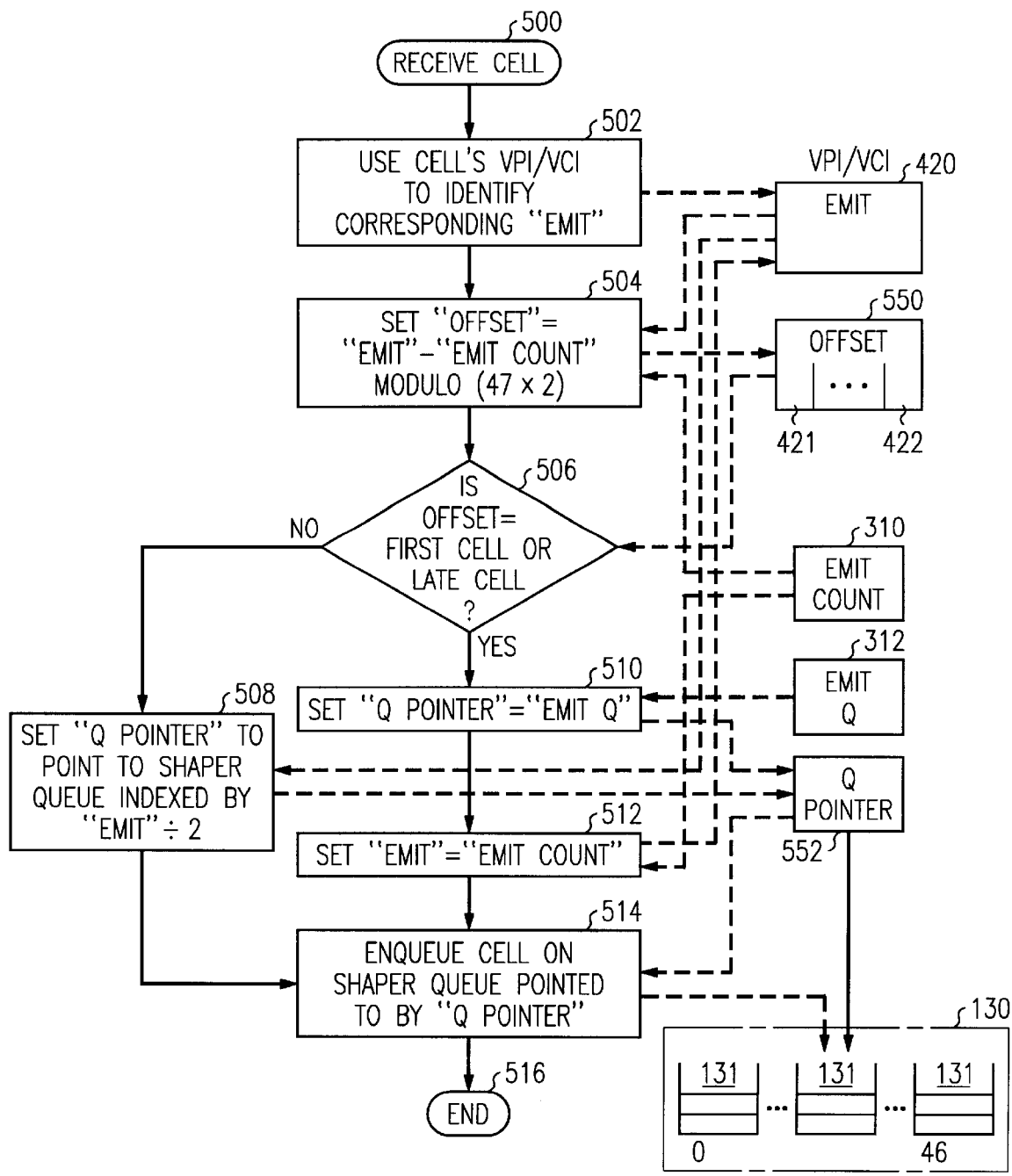
FIG. 5 is a functional flow diagram of an enqueuing function of the state machine of the traffic shaper of FIG. 2.

An enqueuing function of FIG. 5 enqueues a cell to one of the shaper queues 131. Its execution is triggered by receipt of a cell from ATM layer 121, at step 500. Upon its invocation, it uses the VPI/VCI of the cell's ATM header to identify the "emit" variable 420 that is associated with this virtual circuit, at step 502. The function then sets a local variable "offset" 550 to equal the value of "emit" 420 minus the value of "emit count" 310, modulo 47·2 (i.e., 94), at step 504, and checks if the result indicates a first cell or a late cell for this virtual circuit, at step 506. As in the case of "emit" 420 a set LSB 421 of "offset" 550 indicates a first cell, and a set MSB 422 of "offset" 550 indicates a late cell. If neither a first nor a late cell is indicated, the function sets a local variable "Q pointer" 522 to point to the shaper queue 131 that is indexed by the value of "emit" 420 divided by two, at step 508. If either a first or a late cell is indicated at step 506, the function sets the value of "Q pointer" 522 to the value of "emit Q" 312, at step 510, and then sets the value of "emit" 420 to the value of "emit count" 310, at step 512. Following step 508 or 512, the function enqueues the cell that it received at step 500 in the shaper queue 131 pointed to by "Q pointer" 522, at step 514. It then ends its operation, at step 516, until the next cell is received.

Figure 6:
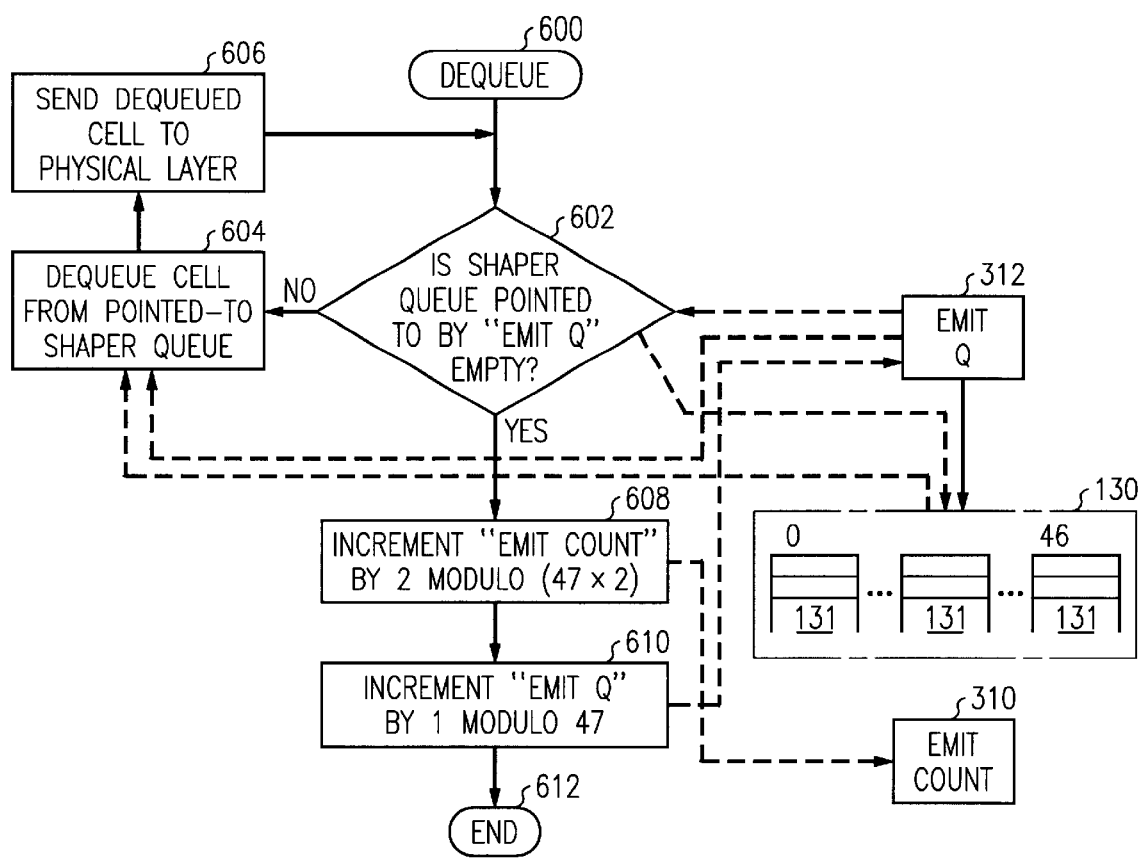
FIG. 6 is a functional flow diagram of a dequeuing function of the state machine of the traffic shaper of FIG. 2.

A dequeing function of FIG. 6 dequeues cells from one of the shaper queues 131 during each processing interval of 125 us. Upon its invocation at the start of each processing interval, at step 600, the function checks whether the one of the shaper queues 131 that is pointed to by "emit Q" 312 is empty, at step 602. If it is not empty, the function dequeues a cell from that queue 131, at step 604, and sends the dequeued cell to physical layer 120, at step 606. The function then returns to step 602. If and when the function determines at step 602 that the shaper queue 131 pointed to by "emit Q" 312 is empty, its job for this operating interval is done. It increments "emit count" 310 by two, modulo 47·2 (i.e., 94), at step 608—incrementing and counting "emit count" 310 by two ensures an emit count that is always even and thus does not mask the "first cell" flag 421 of "emit" 420. The function also increments "emit Q" 312 by one, modulo 47, to set it pointing to the next sequential one of the shaper queues 131, at step 610. The function then ends its operation, at step 612.

Figure 7:
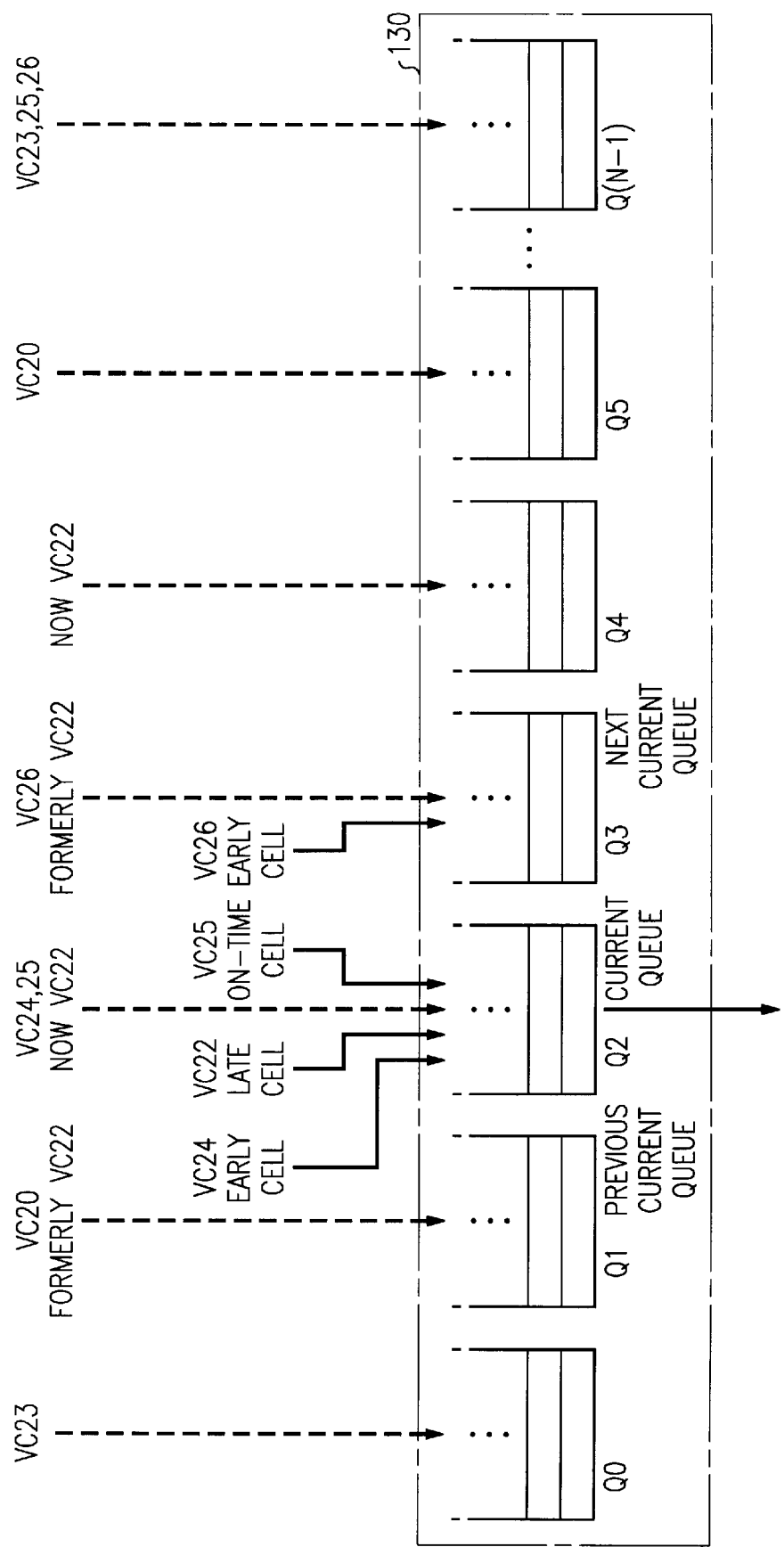
FIG. 7 is a diagram of a second embodiment of the traffic shaper of the ATM cell constructor of FIG. 1.

A second illustrative embodiment of traffic shaper 121 configured according to this invention is shown in FIG. 7. It is tailored to serve both narrowband and wideband CBR virtual circuits. With respect to narrowband channels, it is configured and operates as shown in FIG. 2 with the exception that, instead of using 47 shaper queues 130, it uses N shaper queues, where N is at least equal to the number of queue processing intervals in the maximum expected cell delay (the time difference between receipt and transmittal of a cell) that traffic shaper 121 will have to introduce for a constant bit rate virtual circuit. For example, if the maximum expected cell delay is 20 ms, then N=20 ms/125 us=160. Alternatively, N may be viewed as the multiple of the maximum expected cell delay and the peak instantaneous cell rate of the fastest one of the virtual circuits.

As was mentioned previously, each wideband circuit comprises a plurality of narrowband circuits. Hence, each wideband circuit has a plurality of corresponding serving queues—as many as there are narrowband circuits that make up this wideband circuit—evenly spaced (separated by an equal number of queues) within sequence 130 of queues 131. As shown in FIG. 7, for example, serving queues of VC 23 include Q0 and Q(N–1); serving queues of VC 20 include Q1 and Q5;

serving queues of VC 22 include Q1 and Q3; serving queues of VC 25 include Q2 and Q(N–1); and serving queues of VC 25 include Q3 and Q(N—1). As in the example of FIG. 2, dequeue state machine 141 empties one of the queues 131—preferably the current queue—during each queue-processing period, and successive ones of the queues 131 are designated as the current queue during successive queue-processing periods.

When ATM layer 121 makes an ATM cell of a wideband virtual circuit available on time, i.e., while one of the serving queues of the virtual circuit is the current queue, the virtual circuit's corresponding state machine instance enqueues the cell in the current queue. For example, if a cell of VC 25 becomes available while Q2, one of VC 25's serving queues, is the current queue, the cell is enqueued in Q2, as shown in FIG. 2. If the cell is made available early, i.e., before a next serving queue of this virtual circuit becomes the current queue, the state machine instance enqueues the cell in the next serving queue of this virtual circuit. For example, if a cell of VC 24 becomes available while Q1 is the current queue, the cell is enqueued in Q2, one of VC 24's serving queues; similarly, if a cell of VC 26 becomes available while Q2 is the current queue, the cell is enqueued in Q3, one of VC 26's serving queues, as shown in FIG. 7. If the cell is made available late, i.e., after a serving queue of this virtual circuit has ceased to be the current queue, the state machine instance enqueues the cell in the current queue and the definition of each one of this virtual circuit's serving queues is shifted by the same amount so that the current queue becomes one of the virtual circuit's serving queues. For example, it a cell of VC 22, whose serving queues include Q1 and Q3, becomes available when Q2 is the current queue, the cell is enqueued in Q2 and the definition of what are VC 22's serving queues is shifted by one queue so that Q2 becomes a serving queue of VC 22 instead of Q1, Q4 becomes a serving queue of VC 22 instead of Q3, and so on. The current queue thus becomes a substitute for the serving queue that has last ceased to be the current queue.

All of this again ensures that a minimum interval is maintained between successive cells of the same VC received by physical layer 120, and hence ensures that a virtual circuit does not exceed its peak allowed instantaneous cell rate.

Figure 8:
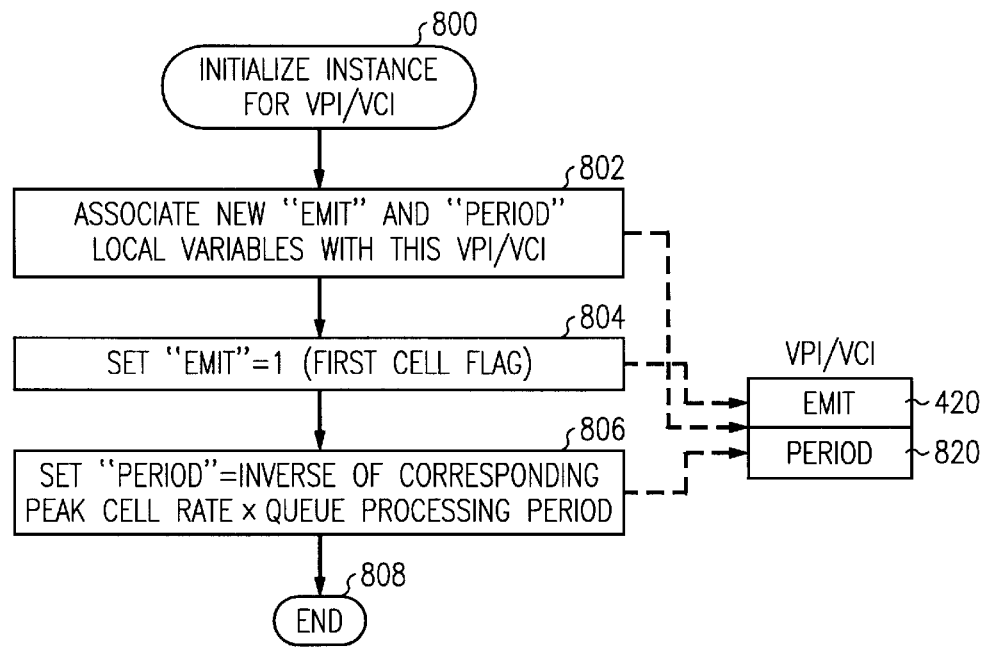
FIG. 8 is a functional flow diagram of an instance initialization function of a state machine of the traffic shaper of FIG. 7.

State machines 140–141 of the implementation of FIG. 7 also include a plurality of functions, shown in FIGS. 3 and 8–10. Global initialization of state machines 140–141, shown in FIG. 3, does not change from the previously-described embodiment. As shown in FIG. 8, initialization of an instance of enqueue state machine 140 for a particular virtual circuit, be it a narrowband or a wideband circuit, requires the definition of an additional variable that defines the minimum allowed period of time between successive cells of that virtual circuit, i.e., it defines the spacing between serving queues of this virtual circuit in sequence 130 lo of shaper queues 131. For example, in FIG. 7 the "period" for a narrowband channel is N, and for a wideband channel consisting of X narrowband channels it is N/X. Upon its invocation, at step 800, the function is passed the VPINCI of this virtual circuit and the peak allowed instantaneous cell rate. In response, it associates new local variables "emit" 420 and "period" 820 with this VPINCI, at step 802. It then sets the value of "emit" 420 to one, at step 804, which serves as a flag that indicates a first cell for this virtual circuit. The function also sets the value of "period" 820, at step 806. The function then ends its operation, at step 808.

Figure 9:
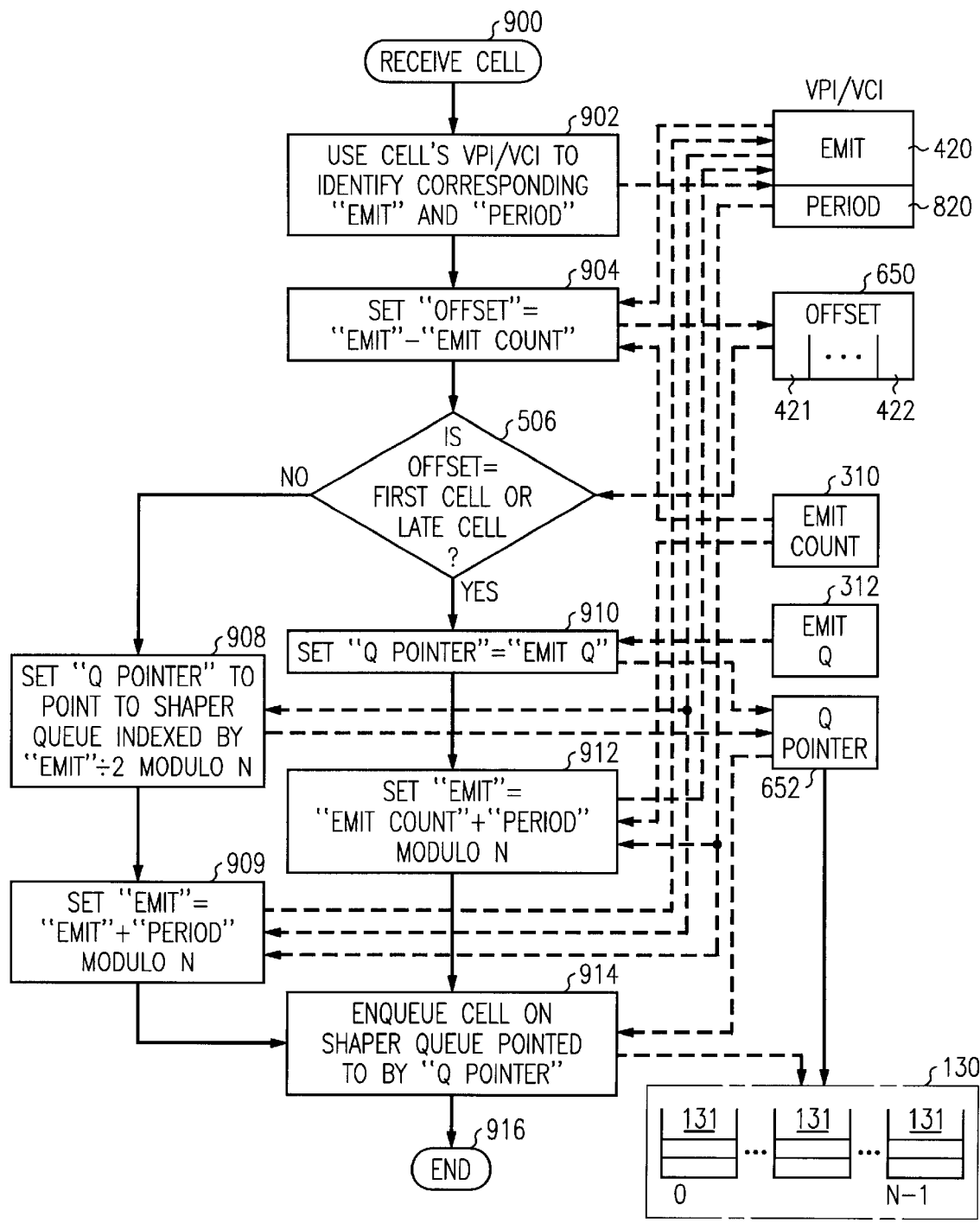
FIG. 9 is a functional flow diagram of an enqueuing function of the state machine of the traffic shaper of FIG. 7.

The function of FIG. 9 enqueues a cell to one of the shaper queues 131. Its execution is triggered by receipt of a cell from ATM layer 120, at step 900. Upon its invocation, it uses the VPI/VCI of the cell's ATM header to identify the "emit" variable 420 and "period" variable 820 that are associated with this virtual circuit, at step 902. The function then sets a local variable "offset" 650 to equal the value of "emit" 420 minus the value of "emit count" 310, at step 904, and checks if the result indicates a first cell or a late cell for this virtual circuit, at step 906. As in the case of "emit" 420, a set LSB 421 of "offset" 650 indicates a first cell and a set MSB 422 of "offset" 650 indicates a late cell. If neither a first nor a late cell is indicated, the function sets a local variable "Q pointer" 652 to point to the shaper queue 131 that is indexed by a value of "emit" 420 divided by two, modulo P, at step 908, where P is an integral multiple of N and P≧4N. The function then increments the value of "emit" 420 by the value of "period" 820, at step 909. If either a first or a late cell is indicated at step 906, the function sets the value of "Q pointer" 652 to the value of "emit Q" 312, at step 910, and then sets the value of "emit" 420 to the value of "emit count" 310, at step 912. Following step 909 or 912, the function enqueues the cell that it received at step 900 in the shaper queue 131 pointed to by "Q pointer" 652, at step 914. It then ends its operation, at step 916, until the next cell is received.

Figure 10:
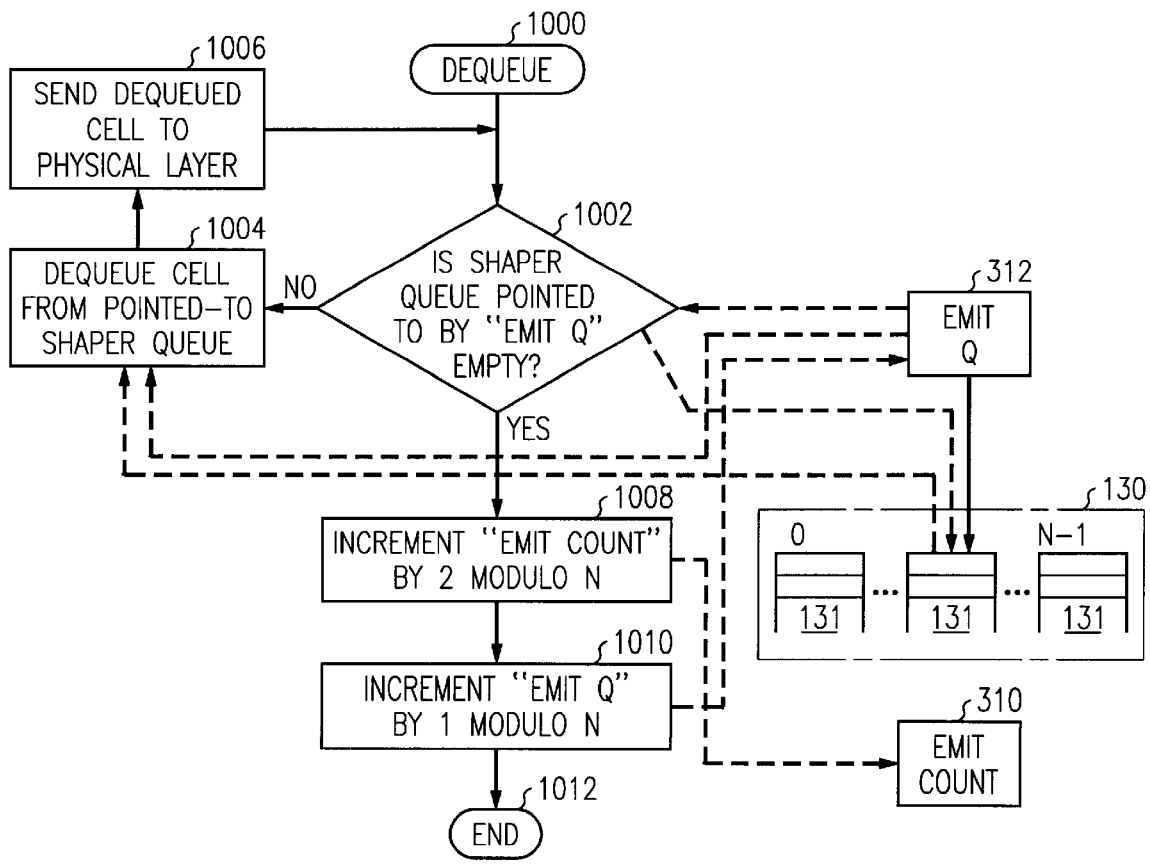
FIG. 10 is a functional flow diagram of a dequeuing function of the state machine of the traffic shaper of FIG. 7.

The function of FIG. 10 dequeues cells from one of the shaper queues 131 during each cell-processing period. Upon its invocation at the start of each period, at step 1000, the function checks whether the one of the shaper queues 131 that is pointed to by "emit Q" 312 is empty, at step 1002. If it is not empty, the function dequeues a is cell from that queue 131, at step 1004, and sends the dequeued cell to physical layer 120, at step 1006. The function then returns to step 1002.

If and when the function determines at step 1002 that the shaper queue 131 pointed to by "emit Q" 312 is empty, its job for this operating interval is done. It increments "emit count" 310 by two, modulo P, at step 108, and increments "emit Q" 312 by one, modulo P, to set it pointing to the next one of shaper queues 131 in sequence 130, at step 1010. The function then ends its operation, at step 1012.

Figure 11:
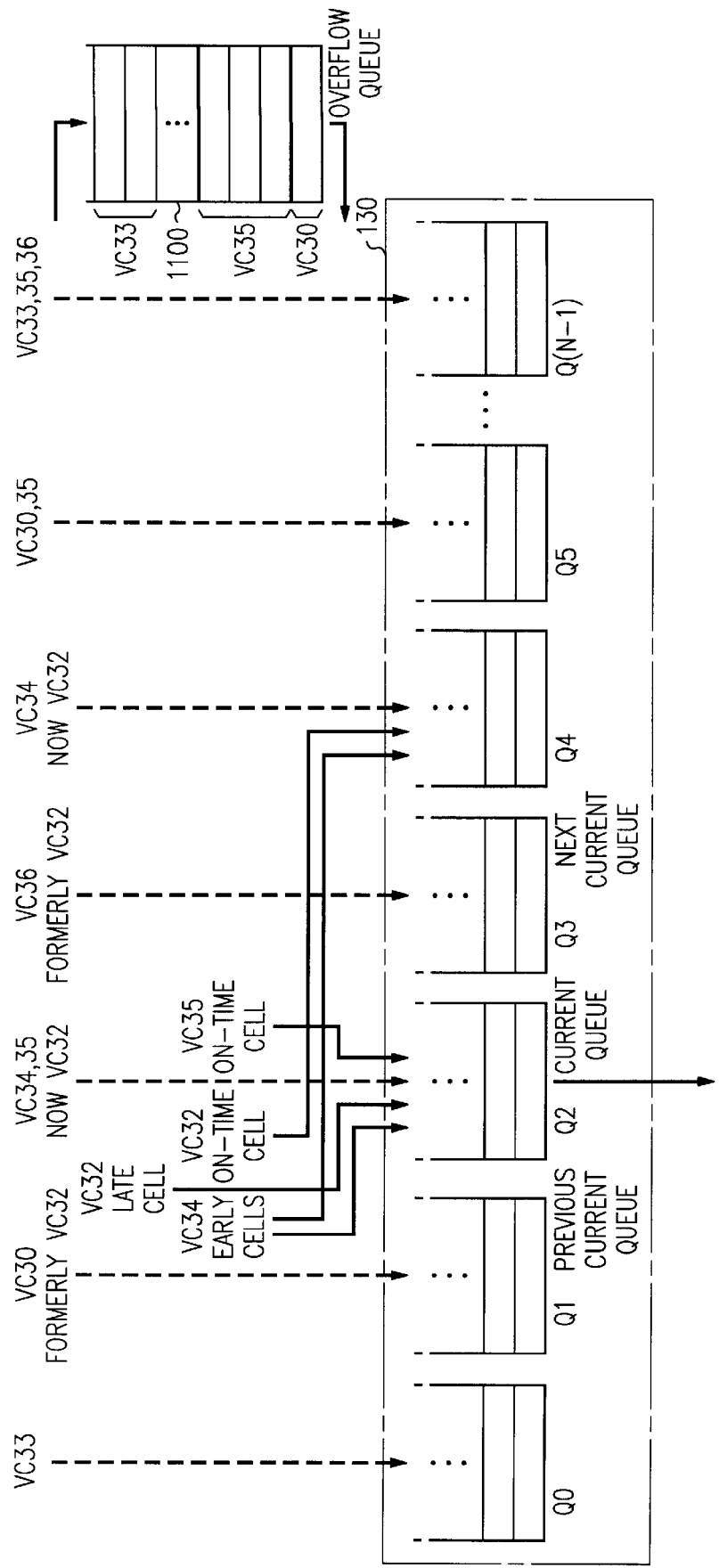
FIG. 11 is a diagram of a third embodiment of the traffic shaper of the ATM cell constructor of FIG. 1.

A third illustrative embodiment of traffic shaper 121 configured according to the invention is shown in FIG. 11. It is tailored to serve virtual circuits of any kind, be they narrowband or wideband, constant bit-rate or variable bit-rate. With respect to constant-bit-rate virtual circuits, it is configured and operates as shown in FIG. 7 and described in conjunction therewith. With respect to variable-bit-rate virtual circuits, it also is configured and operates as shown in FIG. 7 with the exception that, in addition to shaping queues 131, it makes use of an overflow queue 1100 when necessary.

A variable-bit-rate virtual circuit can produce a plurality of cells substantially at the same time. Each one of a plurality of early cells is treated as an early cell, and each is enqueued in a different one of the virtual circuit's serving queues. For example, if, during the time that Q1 is the current queue, two cells arrive for VC 34, whose serving queues include Q2 and Q4, one of the cells is enqueued in Q2 and the other cell is enqueued in Q4, as shown in FIG. 11. Each one of a plurality of cells that includes a late cell results in the late (first) cell being treated as a late cell, and the other cells are treated as early cells. For example, if, during the time that Q2 is the current queue, a late cell and an on-time cell arrive for VC 32, whose serving queues include Q1 and Q3, the late cell is enqueued in current Q2, the serving queues of VC 32 are shifted from Q1, Q3, etc. to Q2, Q4, etc., and the second cell is enqueued in Q4. There is no change in treatment of on-time cells, as only one cell can be on-time during a queue processing period.

Overflow of queues 131 occurs when so many cells arrive for a virtual circuit so quickly in succession that each serving queue of that virtual circuit presently holds one cell of that virtual circuit and the enqueuing gets ahead of the dequeuing, so that enqueuing of another cell of this virtual circuit would result either in a serving queue of this virtual circuit simultaneously storing two or more cells of this virtual circuit or in the enqueuing wrapping around the sequence of serving queues and thereby possibly causing cells to be transmitted out of order. Overflow queue 1100 comes into play then, and is used to temporarily store any overflow cells of any and all virtual circuits before the dequeuing function makes room for them in queues 131. For example, as shown in FIG. 11, overflow queue 1100 may at one time hold a single overflow cell for VC 30, followed by three overflow cells for VC 35, etc., and ending in two overflow cells fore VC 33. The overflow cells are periodically moved from overflow queue 1 100 to queues 131 as room becomes available. To simplify operation, any cells for a virtual circuit that arrive while any cells for this virtual circuit remain in overflow queue 1100 are treated as overflow cells and are enqueued in overflow queue 1100.

Figure 3:
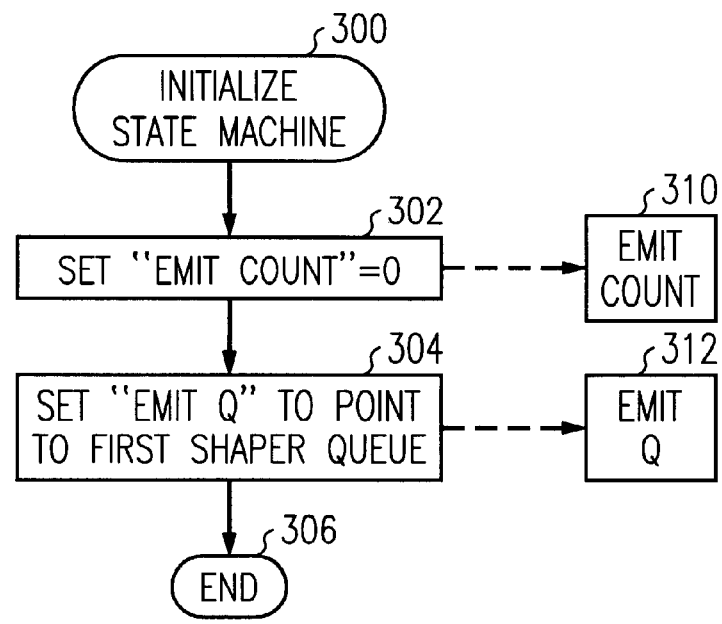
FIG. 3 is a functional flow diagram of a global initialization function of a state machine of the traffic shaper of FIG. 2.
Figure 12:
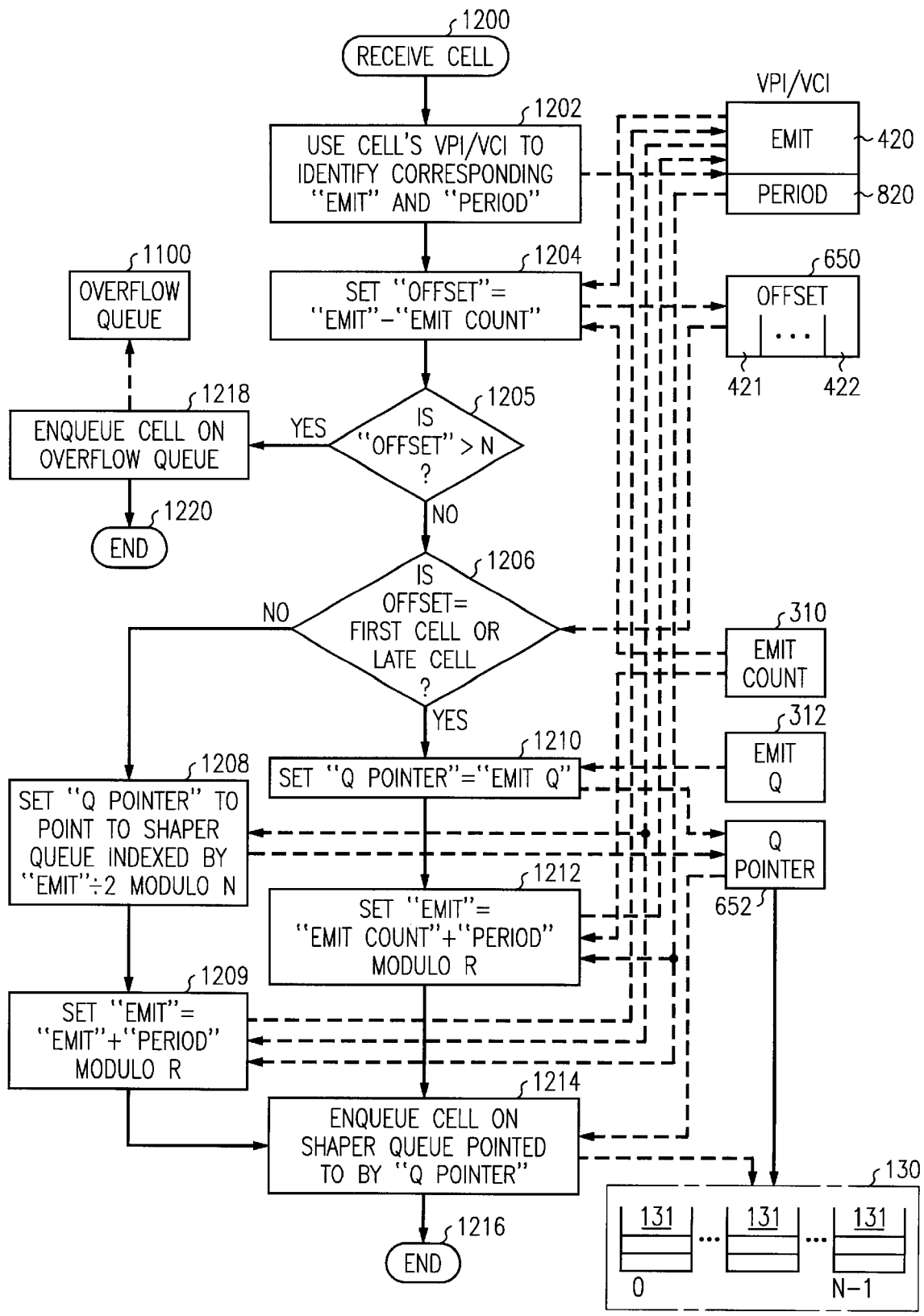
FIG. 12 is a functional flow diagram of an enqueuing function of the state machine of the traffic shaper of FIG. 11.

State machines 140–141 of the implementation of FIG. 11 include the initialization functions shown in FIGS. 3 and 8, plus the enqueuing function shown in FIG. 12 and the dequeuing function shown in FIG. 13. Execution of the enqueuing function of FIG. 12 is triggered by the ATM layer making a cell available, at step 1200. Upon its invocation, it uses the VPI/VCI of the cell's ATM header to identify the "emit" variable 420 and "period" variable 820 that are associated with this virtual 1o circuit, at step 1202. The function then sets a local variable "offset" 650 to equal the value of "emit" 420 minus the value of "emit count" 310, at step 904, and checks if the result is greater than N (the number of shaping queues 131 in sequence 130), at step 1205. Value of "offset" 650 greater than N indicates an overflow condition, and so the function merely enqueues the received cell on overflow queue 1100, at step 1218, and then ends its operation, at step 1220. If an overflow condition is not detected at step 1205, the function proceeds to steps 1206 et seq. that duplicate the steps 906 et seq. of FIG. 9, with the exception that the modulo operation in steps 1209 and 1212 is modulo R and not modulo P. R is an integral multiple of N at least equal to P, and is also equal to or greater than the number of cell processing periods in the maximum expected cell delay that traffic shaper 121 will have to introduce for any virtual circuit. For example, if N is 160 and the maximum expected cell delay for any virtual circuit is 70 ms, then R=î70 ms/125 us$(i)_N$=4N=640.

The function of FIG. 13 dequeues cells from overflow queue 1100 once during each full cycle of operating intervals and dequeues calls from one of the shaper queues during each operating interval. Upon its invocation at the start of each interval, at step 1300, the function checks whether the value of "emit count" 310 is zero, at step 1301. If so, it means that a new cycle of operating intervals is starting, and so the function proceeds to do overflow queue 1100 processing. It checks whether overflow queue 1100 is empty, at step 314. If it is not empty, the function dequeues a cell from overflow queue 1100, at step 1316, and sends it to the enqueuing function of FIG. 12, at step 1318. The enqueuing function of FIG. 12 treats the cell as if it had just been received from ATM layer 122. The dequeuing function then returns to step 314. If and when the dequeuing function finds at step 314 that overflow queue 1100 is empty, or if it finds at step 1301 that "emit count" 310 is not zero, it proceeds to steps 1302 et seq. which duplicate the steps 1002 et seq. of FIG. 10, with the exception that the modulo operation in step 1308 is modulo R and not modulo P.

Of course, various changes and modifications to the illustrative embodiments described above will be apparent to those skilled in the art. For example, the overflow queue may take the form of a hierarchy of a plurality of overflow queues, with each level in the hierarchy corresponding to a different number of processing cycles (processing cycle= processing interval-number of shaper queues) and for storing cells arriving the corresponding number of processing cycles early. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A traffic shaper for a plurality of streams of traffic, comprising:

a sequence of a first plurality of queues shared by the plurality of traffic streams, each of the traffic streams having at least one of the queues designated as its serving queue;

dequeuing means cooperative with the first plurality of queues for cyclically transmitting contents of the sequence of the queues by transmitting the contents of a different sequential one of the queues during each sequential period of a said first plurality of periods, wherein during each period a queue having a fixed offset in the sequence from the queue whose contents are being transmitted forms a current queue for that period; and enqueuing means cooperative with the first plurality of queues and responsive to receipt of traffic from any said traffic stream during a period before a serving queue of that traffic stream becomes the current queue for said period, for storing the received traffic in the serving queue of traffic stream, further responsive to receipt of traffic from any said traffic stream during a period when a serving queue of that traffic stream is the current queue for said period, or storing the received traffic in the current queue for said period, and further responsive to receipt of traffic from any said traffic stream during a period after a serving queue of that traffic stream ceased being the current queue for said period, for storing the received traffic in the current queue for said period and changing the designation of the at least one serving queue of that traffic stream to designate the current queue of said period as a serving queue of that traffic stream.

2. The traffic shaper of claim 1 wherein:

the at least one serving queue of a traffic stream comprises a plurality of serving queues spaced evenly in the sequence of queues, and the enqueuing means change the designation of the at least one serving queue of said traffic stream by shifting the designation from each of the serving queues a same distance in the sequence to other queues that include the current queue.

3. The traffic shaper of claim 2 wherein:

the shifting effected by the enqueuing means comprises shifting the designation a distance in the sequence from the serving queue of said traffic stream that last ceased being the current queue to the current queue and shifting the designation from each of the other serving queues of said traffic stream a same said distance to another queue.

4. The traffic shaper of claim 1 wherein:

the first plurality of queues comprises at least as many queues as there are said periods in a maximum time between receipt of traffic of any stream by the enqueuing means and transmission of said traffic of said stream by the dequeuing means.

5. The traffic shaper of claim 1 wherein:

the first plurality of queues comprises a number of queues at least equal to a maximum time between receipt of traffic of any stream by the enqueuing means and transmission of said traffic of said steam by the dequeuing means, times a peak instantaneous rate of receipt of the traffic of a fastest one of the traffic streams.

6. The traffic shaper of claim 1 wherein:

the fixed offset is zero.

7. The traffic shaper of claim 1 wherein:

the traffic of each traffic stream comprises a sequence of a plurality of packets of the traffic.

8. The traffic shaper of claim 1 wherein:

each traffic stream comprises an asynchronous transfer mode (ATM) virtual circuit.

9. The traffic shaper of claim 1 wherein:

each period comprises a time interval at most equal to an inverse of a peak instantaneous rate of receipt of the traffic of a fastest one of the traffic streams.

10. The traffic shaper of claim 1 wherein:

each traffic stream is a constant-bit-rate (CBR) traffic stream of a same size; and each traffic stream has only one queue designated as its at least one serving queue.

11. The traffic shaper of claim 1 wherein:

each traffic stream is a constant-bit-rate traffic stream of any one of a plurality of different sizes; and each traffic stream has a non-zero number of queues proportional to its size designated as its at least one serving queue, and the serving queues of each traffic stream are equally spaced within the sequence of queues.

12. The traffic shaper of claim 1 wherein:

at least one of the traffic streams is a variable-bit-rate traffic stream of one of a plurality of different sizes;

the one traffic stream has a non-zero number of queues proportional to its size designated as its at least one serving queue, and the serving queues of the one traffic stream are equally spaced within the sequence of queues; and the traffic shaper further includes at least one overflow queue for storing any traffic of any stream received when operation of the enqueuing means would get ahead of operation of the dequeuing means, and means for causing the enqueuing means to receive traffic stored in the overflow queue when operation of the dequeuing means has made room for storing the traffic stored in the overflow queue available in the sequence of the queues.

13. The traffic shaper of claim 12 wherein:

operation of the enqueuing means getting ahead of operation of the dequeuing means would result in storing of said any traffic in a queue of the first plurality of queues that presently already stores received traffic of any said traffic stream.

14. The traffic shaper of claim 12 wherein:

the at least one overflow queue comprises a hierarchy of a plurality of overflow queues.

15. A traffic shaper for a plurality of packetized channels each comprising a stream of packets, comprising:

a first plurality of queues shared by the plurality of channels, each of the channels having at least one of the queues designated as its serving queue;

dequeuing means cooperative with the plurality of queues for cyclically periodically transmitting contents of a current one of the queues by transmitting the contents of a different one of the queues during each period of a said first plurality of periods; and enqueuing means cooperative with the plurality of queues and responsive to receipt of a packet from any said channel before a serving queue of that channel becomes the current queue, for storing the received packet in the serving queue of that channel, further responsive to receipt of a packet from any said channel when a serving queue of that channel is the current queue, for storing the received packet in the current queue, and further responsive to receipt of a packet from any said channel after a serving queue of that channel ceased being the current queue, for storing the received packet in the current queue and changing the designation of the at least one serving queue of that channel to designate the current queue as a serving queue of that channel.

16. The traffic shaper of claim 15 wherein:

each packetized channel is an asynchronous transfer mode (ATM) virtual circuit and the packets are ATM cells.

17. The traffic shaper of claim 15 wherein:

each ATM virtual circuit is a constant-bit-rate (CBR) virtual circuit of a same size, the at least one serving queue of each ATM virtual circuit is a single serving queue, and the plurality of queues is forty-seven queues.

18. The traffic shaper of claim 15 wherein:

the first plurality of queues comprises a sequence of the first plurality of queues;

the dequeuing means transmits contents of the queues sequentially in said sequence;

the at least one serving queue of a channel comprises a plurality of serving queues spaced evenly in said sequence; and the enqueuing means change the designation of the at least one serving queue of said channel by shifting the designation from each of the serving queues a same distance in the sequence to other queues that include the current queue.

19. The traffic shaper of claim 18 wherein:

each packetized channel is an asynchronous transfer mode (ATM) virtual circuit and the packets are ATM cells.

20. The traffic shaper of claim 19 wherein:

some of the ATM virtual circuits are of a different size than others of the virtual circuits;

each virtual circuit has a number of serving queues proportional to its size; and the plurality of queues comprises at least as many queues as there are said periods in a maximum time between receipt of an ATM cell by the enqueuing means and transmission of said ATM cell by the dequeuing means.

21. The traffic shaper of claim 19 wherein:

at least one ATM virtual circuit is a variable-bit-rate virtual circuit and some of the virtual circuits are of a different size than others of the virtual circuits;

each virtual circuit has a number of serving queues proportional to its size; and the traffic shaper further includes at least one overflow queue for storing any ATM cells of any virtual circuit received when operation of the enqueuing means would get ahead of operation of the dequeuing means, and means for causing the enqueuing means to receive an ATM cell stored in the overflow queue when operation of the dequeuing means has made room for storing the ATM cell stored in the overflow queue available in the sequence of queues.

22. The traffic shaper of claim 21 wherein:

operation of the enqueuing means getting ahead of operation of the dequeuing means would result in storing of said any ATM cell in a queue that presently already stores a received ATM cell of said any virtual circuit.

23. A method of shaping traffic of a plurality of streams of traffic, comprising:

for each one of the plurality of traffic streams, designating at least one of a sequence of a first plurality of queues shared by the plurality of traffic streams as a serving queue of said one traffic stream;

cyclically transmitting contents of the sequence of the queues by transmitting the contents of a different sequential one of the queues during each sequential period of a said first plurality of periods, wherein during each period a queue having a fixed offset in the sequence from the queue whose contents are being transmitted forms a current queue for that period;

in response to receipt of traffic from any said traffic stream during a period before a serving queue of that traffic stream becomes the current queue for said period, storing the received traffic in the serving queue of that traffic stream;

in response to receipt of traffic from any said traffic stream during a period when a serving queue of that traffic stream is the current queue for said period, storing the received traffic in the current queue; and in response to receipt of traffic from any said traffic stream during a period after a serving queue of that traffic stream ceased being the current queue for said period, storing the received traffic in the current queue for that period, and changing the designation of the at least one serving queue of that traffic stream to designate the current queue for said period as a serving queue of that traffic stream.

24. The method of claim 23 wherein:

designating comprises for at least one traffic stream, designating a plurality of the queues spaced evenly in the sequence of queues as the serving queues of said one traffic stream; and changing the designation comprises shifting the designation from each of the serving queues of said one traffic stream a same distance in the sequence to other queues that include the current queue.

25. The method of claim 24 wherein:

shifting the designation comprises shifting the designation a distance in the sequence from the serving queue that last ceased being the current queue to the current queue, and shifting the designation from each of the other serving queues a same said distance to another queue.

26. The method of claim 23 wherein:

the first plurality of queues comprises at least as many queues as there are said periods in a maximum time between receipt of traffic of any stream by the enqueuing means and transmission of said traffic of said stream by the dequeuing means.

27. The method of claim 23 wherein:

the first plurality of queues comprises a number of queues at least equal to a maximum time between receipt of traffic of any stream by the enqueuing means and transmission of said traffic of said stream by the dequeuing means, times a peak instantaneous rate of receipt of the traffic of a fastest one of the traffic streams.

28. The method of claim 23 wherein:

the fixed offset is zero.

29. The method of claim 23 wherein:

the traffic of each traffic streams comprises a sequence of a plurality of packets of traffic.

30. The method of claim 23 wherein:

each traffic stream comprises an asynchronous transfer mode (ATM) virtual circuit.

31. The method of claim 23 wherein:

each period comprises a time interval at most equal to an inverse of a peak instantaneous rate of receipt of the traffic of a fastest one of the traffic streams.

32. The method of claim 23 wherein:

each traffic stream is a constant-bit-rate (CBR) traffic stream of a same size; and each traffic stream has only one queue designated as its at least one serving queue.

33. The method of claim 23 wherein:

each traffic stream is a constant-bit-rate (CBR) traffic stream of any one of a plurality of different sizes; and each traffic stream has a non-zero number of queues proportional to its size designated as its at least one serving queue, and the serving queues of each traffic stream are equally spaced within the sequence of queues.

34. The method of claim 23 wherein:

at least one of the traffic streams is a variable-bit-rate traffic stream of one of a plurality of different sizes; and the one traffic stream has a non-zero number of queues proportional to its size designated as its at least one serving queue, and the serving queues of the one traffic stream are equally spaced within the sequence of queues; and each step of storing includes storing the received traffic in an overflow queue instead of a queue of the first plurality of queues if storing the received traffic in the queue of the first plurality of queues would get ahead of the cyclically transmitting, and in response to room for storing the traffic stored in the overflow queue having been made available in the first plurality of queues by said is cyclically transmitting contents of the sequence of queues, storing the traffic stored in the overflow queue in the first plurality of queues.

35. The method of claim 34 wherein:

the storing getting ahead of the cyclically transmitting would result in storing of the received traffic in a queue that presently already stores received traffic of said traffic stream.

36. A method of shaping traffic of a plurality of packetized channels each comprising a stream of packets, comprising:

for each one of the plurality of channels, designating at least one of a first plurality of queues shared by the plurality of channels as a serving queue of said one channel;

cyclically periodically transmitting contents of a current one of the queues by transmitting the contents of a different one of the queues during each period of a said first plurality of periods;

in response to receipt of a packet from any said channel before a serving queue of that channel becomes a current queue, storing the received packet in the serving queue of that channel;

in response to receipt of a packet from any said channel when a serving queue of that channel is the current queue, storing the received packet in the current queue; and in response to receipt of a packet from any said channel after a serving queue of that channel ceases being the current queue, storing the received packet in the current queue, and changing the designation of the at least one serving queue of that channel to designate the current queue as a serving queue of that channel.

37. The method of claim 36 wherein:

each packetized channel is an asynchronous transfer mode (ATM) virtual circuit and the packets are ATM cells.

38. The method of claim 36 wherein:

each ATM virtual circuit is a constant-bit-rate (CBR) virtual circuit of a same size, the at least one serving queue of each ATM virtual circuit is a single serving queue, and the plurality of queues is forty-seven queues.

39. The method of claim 36 wherein:

the first plurality of queues comprises a sequence of the first plurality of queues;

the at least one serving queue of a channel comprises a plurality of serving queues spaced evenly in said sequence;

cyclically periodically transmitting comprises transmitting contents of the queues sequentially in said sequence; and changing the designation comprises shifting the designation of the at least one serving queue of said channel by shifting the designation from each of the serving queues a same distance in the sequence to other queues that include the current queue.

40. The method of claim 39 wherein:

each packetized channel is an asynchronous transfer mode (ATM) virtual circuit and the packets are ATM cells.

41. The method of claim 40 wherein:

some of the ATM virtual circuits are of a different size than others of the virtual circuits;

each virtual circuit has a number of serving queues proportional to its size; and the plurality of queues comprises at least as many queues as there are said periods in a maximum time between receipt of an ATM cell and transmission of said ATM cell.

42. The method of claim 40 wherein:

at least one ATM virtual circuit is a variable-bit-rate virtual circuit and some of the virtual circuits are of a different size than others of the virtual circuits;

each virtual circuit has a number of serving queues proportional to its size; and each step of storing includes storing the received ATM cell of said any virtual circuit in an overflow queue instead of a queue of the first plurality of queues if storing the received ATM cell in the queue of the first plurality of queues would get ahead of the cyclically transmitting, and in response to room for storing the ATM cell stored in the overflow queue having been made available in the first plurality of queues by said cyclically periodically transmitting contents of the current one of the queues, storing the ATM cell stored in the overflow queue in the first plurality of queues.

43. The method of claim 42 wherein:

the storing getting ahead of the cyclically transmitting would result in storing the received ATM cell in a queue that presently already stores a received ATM cell of said any virtual circuit.

44. An apparatus for performing the method of any one of the claims 20–43.

45. A computer-readable medium containing software which, when executed in a computer, causes the computer to perform the method of any one of the claims 20–43.

\* \* \* \* \*